(12) United States Patent  (10) Patent No.: US 7,875,181 B2
Ong et al.  (45) Date of Patent: Jan. 25, 2011

(54) WATER TREATMENT PROCESS

(75) Inventors: Tze Guan Ong, Singapore (SG);
Stephen Tiong Lee Tay, Singapore (SG); Lim Teow Heng, legal representative, Singapore (SG); Joo Hwa Tay, Singapore (SG)

(73) Assignee: Glowtec Bio Pte Ltd, Singapore (SG)

( * ) Notice: Subject to any disclaimer, the term of this patent is extended or adjusted under 35 U.S.C. 154(b) by 299 days.

(21) Appl. No.: 11/994,829

(22) PCT Filed: Jul. 6, 2005

(86) PCT No.: PCT/SG2005/000222

§ 371 (c)(1),
(2), (4) Date: Oct. 31, 2008

(87) PCT Pub. No.: WO2007/004987

PCT Pub. Date: Jan. 11, 2007

(65) Prior Publication Data

US 2009/0127190 A1 May 21, 2009

(51) Int. Cl.
*C02F 3/00* (2006.01)
(52) U.S. Cl. .............. 210/616; 210/620; 210/622; 210/629; 210/150; 210/151; 210/189
(58) Field of Classification Search .............. 210/616, 210/620, 622, 629, 189, 150–151
See application file for complete search history.

(56) References Cited

U.S. PATENT DOCUMENTS 7,060,185 B2  6/2006 Kim et al.

FOREIGN PATENT DOCUMENTS

| EP | 0470931 A2 | 2/1992 |
|---|---|---|
| EP | 0776864 A1 | 6/1997 |
| JP | 05261385 A | 10/1993 |
| JP | 10-109095 | 4/1998 |
| JP | 2001-300568 | 10/2001 |
| JP | 2005-095818 | 4/2005 |
| KR | 2003-0037454 | 5/2003 |
| KR | 2003-0097075 | 12/2003 |
| WO | WO-95/06010 A1 | 3/1995 |
| WO | 98/37027 A1 | 8/1998 |
| WO | 2003/080649 A1 | 8/2003 |
| WO | 2004/024638 A1 | 3/2004 |

OTHER PUBLICATIONS

International Preliminary Report on Patentability mailed Nov. 28, 2006 for PCT/SG2005/000222 filed Jul. 6, 2005, 5 pages.

(Continued)

*Primary Examiner*—Chester T Barry
(74) *Attorney, Agent, or Firm*—Morrison & Foerster LLP

(57) ABSTRACT

A water treatment process comprising: (a) providing bioactive material in waste water, the bioactive material containing microorganisms capable of removing one or more impurities from the waste water, wherein at least 40% by volume of said bioactive material in said waste water is in granular form; and (b) passing a portion of the waste water through a membrane separator, whereby the membrane separator prevents the bioactive material from passing therethrough.

42 Claims, 12 Drawing Sheets

OTHER PUBLICATIONS

International Search Report mailed Aug. 29, 2005 for PCT Application No. PCT/SG2005/000222 filed Jul. 6, 2005, 3 pages.

Arrojo et al., "Aerobic granulation with industrial wastewater in sequencing batch reactors", Water Research, vol. 38, 2004, pp. 3389-3399.

Chu et al., "Anaerobic treatment of domestic wastewater in a membrane-coupled expended granular sludge bed (EGSB) reactor under moderate to low temperature", Process Biochemistry, vol. 40, 2005, pp. 1063-1070.

Extended European Search Report for EP Patent Application No. 05757864.3, mailed on Aug. 4, 2008, 14 pages.

Li et al., "Treatment of synthetic wastewater by a novel MBR with granular sludge developed for controlling membrane fouling", Separation and Purification Technology, vol. 46, 2005, pp. 19-25.

Lim et al., "Membrane fouling and cleaning in microfiltration of activated sludge wastewater", Journal of Membrane Science, vol. 216, 2003, pp. 279-290.

Step 1

Step 2

Step 3

Step 4

Step 5

Step 6

WATER TREATMENT PROCESS

CROSS REFERENCE TO RELATED APPLICATIONS

This application is a U.S. National Phase §371 application of PCT/SG2005/000222 filed Jul. 6, 2005, the contents of which are hereby incorporated by reference in the present disclosure in their entirety.

TECHNICAL FIELD

The present invention generally relates to a water treatment process. The present invention also relates to a method of forming bioactive granules for use in a water treatment process and to a water treatment system.

BACKGROUND

Membrane Bioreactor (MBR) systems have been increasingly used to treat waste. MBR systems utilise a reactor having a chamber comprising activated sludge and membrane separation equipment. The activated sludge contains microorganisms that are able to remove contaminant or undesirable species present in waste water. Solids are removed from the treated water using the membrane separation equipment, which due to its pore size, may also selectively remove contaminant species remaining in solution.

MBR systems exhibit several advantages compared to the traditional activated sludge processes, such as high effluent quality, limited space requirement and as an extension of existing waste water treatment plants.

A common problem associated with MBR systems is that the activated sludge causes fouling of the membrane. Membrane fouling may be attributed to precipitation, deposition or adsorption of solute species or particles onto the surfaces and/or into the pores of the membrane. Membrane fouling may be biological in nature and foulant species may comprise bacterial floc and supernatant species including extracellular polymeric substances. Membrane fouling leads to significant flux reduction through the membrane, higher transmembrane pressures and other operational inefficiencies.

Fouling of the membrane leads to the MBR system having to be shut down while the membranes is either cleaned and/or replaced.

There have been various attempts to circumvent fouling of membranes. For example, U.S. Pat. No. 4,636,473 discloses an elaborate anti-fouling device for preventing fouling on a membrane. The disadvantage with the anti-fouling system disclosed in U.S. Pat. No. 4,636,473 is that the system requires an elaborate housing arrangement and the application of reverse flow through the housing after a selected period of time, or after a selected pressure level has been reached, to avoid fouling of membrane surfaces and to prevent the formation of any appreciable caked substance on any membrane surface. This arrangement is costly to implement and is somewhat cumbersome to operate.

Li et al have attempted to improve membrane performance for wastewater treatment using aerobic granular sludge. Li et al seeded a submerged membrane bioreactor with granular sludge. The reactor was initially seeded with granular sludge up to a volumetric concentration of 8 gL$^{-1}$. After 3-5 days of operation, the sludge concentration within the reactor increased to 15+/−2 gL$^{-1}$ (i.e. the volumetric percentage concentration of the sludge in granular form was in the range of about 32% to about 38%). Once steady state was reached, the submerged membrane bioreactor was used to treat a synthetic wastewater consisting of glucose, protein and trace nutrients.

Li et al found improved permeate flux decline when the submerged membrane operated with about 32% to about 38% granular sludge relative to when the submerged membrane was operated with no sludge in granular form. However, the submerged membrane in Li et al was still subjected to pore blocking and the adsorption of colloids or solutes, which resulted in a significant decline in flux permeate.

There is a need to provide a water treatment system that avoids or at least ameliorates one or more of the disadvantages described above.

SUMMARY

According to a first aspect of the invention, there is provided a waste water treatment process comprising the steps of:

(a) providing bioactive material in waste water, the bioactive material containing microorganisms capable of removing one or more impurities from the waste water, wherein at least 40% by volume of said bioactive material in said waste water is maintained in granular form; and (b) passing a portion of the waste water through a membrane separator, whereby the membrane separator prevents the bioactive material from passing therethrough.

In one embodiment, of the first aspect, substantially all of said bioactive material in said waste water is maintained in granular form.

According to a second aspect of the invention, there is provided a waste water treatment process comprising the steps of:

(a) providing bioactive materials in waste water, the bioactive materials containing microorganisms capable of removing one or more impurities from the waste water and wherein at least 40% by volume of said bioactive material in said waste water is in granular form; and (b) passing a portion of the waste water through a membrane separator to produce permeate water having a lower concentration of impurities relative to reject water that has not passed through the membrane separator, whereby the membrane separator prevents the bioactive material from passing therethrough According to a third aspect of the invention, there is provided a method of forming bioactive granules for use in a waste water treatment reactor comprising a chamber that is in fluid communication with a membrane separator, the method of forming bioactive granules comprising the steps of:

(a) seeding bioactive material in waste water within the chamber, the bioactive seed material containing microorganisms capable of removing one or more impurities from the waste water;

(b) growing the microorganisms contained within the bioactive seed material to form larger particles; and (c) removing particles of a selected discharge particle size from the chamber whilst retaining particles of a selected granular size within the chamber.

In one embodiment of the third aspect, the method comprises the further step of (d) agitating the bioactive material to at least partially inhibit deposition of particles on the membrane separator. In one embodiment of the third aspect, the method comprises the further step of (e) introducing further waste water into the chamber before repeating steps (c) and (d). The method may further comprise the step of (f) providing additional bioactive seed material within in step (e).

Advantageously, the step (e) and/or step (f) may be repeated to retaining particles of a selected granular size within the chamber.

According to a fourth aspect of the invention, there is provided a waste water treatment system comprising:

a reactor having a chamber for containing waste water therein;

bioactive materials for suspension in said waste water, the bioactive materials containing microorganisms capable of removing one or more impurities from the waste water, wherein at least 40% by volume of said bioactive material in said waste water is in granular form; and a membrane separator in fluid communication with the chamber, wherein a portion of the waste water is passed through the membrane separator to produce permeate water having a lower concentration of impurities relative to reject water that has not passed through the membrane separator.

According to a fifth aspect of the invention, there is provided a waste water treatment reactor comprising:

a chamber containing bioactive material suspended in waste water, the bioactive material containing microorganisms capable of removing one or more impurities from the waste water, wherein at least 40% by volume of said bioactive material in said waste water is in granular form;

a membrane separator in fluid communication with the chamber for allowing a portion of the waste water to be passed therethrough and thereby, in use, to produce permeate water having a lower concentration of impurities relative to reject water that has not passed through the membrane separator.

According to a sixth aspect of the invention, there is provided water produced in a process comprising the steps of:

(a) providing bioactive material in waste water, the bioactive material containing microorganisms capable of removing one or more impurities from the waste water and wherein at least 40% by volume of said bioactive material in said waste water is in granular form; and (b) passing a portion of the waste water through a membrane separator, whereby the membrane separator prevents the bioactive granules from passing therethrough.

According to a seventh aspect of the invention, there is provided a waste water treatment process comprising the steps of:

(a) providing bioactive material in granular form in waste water, the bioactive material in granular form containing microorganisms capable of removing one or more impurities from the waste water;

(b) removing bioactive material not in granular form from said waste water; and (c) passing a portion of the waste water through a membrane separator, whereby the membrane separator prevents the bioactive material from passing therethrough.

DEFINITIONS

The following words and terms used herein shall have the meaning indicated:

The term "waste water" is used as a common designation for aqueous effluents containing organic and/or inorganic substances which are present or formed in an environment as a consequence of the presence and/or activity of human beings, including industrial activity in its widest sense which e.g. comprises domestic and industrial activity, agriculture, forestry and fishing industry and which it is desired to treat so as to obtain purified water with the main purpose of maintaining and/or improving the environment and/or to provide a production of purified water which can be re-used as tap water.

The term "membrane separator" as used herein refers to any barrier or film which is selectively permeable to different species in waste water. The selective permeability of the barrier or film allows the different species within the waste water to be transported across the barrier or film at different rates when a pressure driving force is applied to the waste water. As some species in waste water are preferentially transported across the barrier or film relative to other species in waste water, it is possible to separate species from the waste water. Impurities in waste water have low permeability across the barrier or film relative to water molecules and hence water that has passed across the membrane (permeate) will have a lower concentration of impurities relative to water that has not passed across the membrane (reject). The membranes used herein are intended to encompass a wide variety of possible configurations known in the prior art. For example, the membrane may be used as a flat film, tubular film or hollow fiber. The membranes may also be made of any material such as organic material, polymeric material, inorganic material and ceramic material etc. Exemplary membranes are disclosed in W. S. Winston Ho and Kamalesh K Sirkar, *Membrane Handbook, Chapter* 28, pages 408-430, Kluwer Academic Publishers, Norwell Mass., United States of America.

The term 'bioactive material' is to be interpreted broadly to mean material that comprises microorganism cultures. The microorganism cultures may comprise a plurality, normally a wide variety, of species of microorganisms such as autotrophic as well as heterotrophic and aerobic, anaerobic or facultative bacteria, as well as lower eucaryotic organisms such as protozoa; yeasts; fungi, and other organisms usually present in activated sludge in the biological treatment step of a waste water purification plant, for example multicellular organisms such as slipper animalcule (*Paramaecium*) and parasites, especially bacteria-consuming parasites. It should also be noted that the bioactive material may contain some microbes that play a structural role in maintaining granule integrity.

The terms 'bioactive granules' and 'biomass granules' are to be interpreted broadly to mean bioactive material that is in granular and/or agglomerated form.

The term "activated sludge" is conventionally used for mixed cultures of microorganisms as defined above which are able to degrade the biodegradable material, i.e. especially decomposable organic and/or inorganic matter. Such mixed cultures of microorganisms utilize the nutrition in the waste water to be treated and thereby convert organic and inorganic matter to biomass and to products of metabolism such as nitrates, nitrogen, sulphates, phosphates, carbon dioxide etc. This conversion can take place under anaerobic conditions, aerobic conditions, anoxic autotrophic conditions and combinations thereof. The actual composition of the mixed cultures of microorganisms may vary widely since the composition is highly dependent on the prevailing conditions.

The term "bioactive seed material" may refer to activated sludge as referred to above that is not in granular form, pure microbial cultures, mixed pure microbial cultures, granular sludge, disintegrated granular sludge and mixtures thereof.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

DETAILED DISCLOSURE OF EMBODIMENTS

Exemplary, non-limiting embodiments of a water treatment process and system will now be disclosed.

The process may be used to remove impurities from waste water. The type and quantity of impurities in waste water will be dependent on the source of the waste water and the application for which the waste water is to be treated, as will be known to those skilled in the art. For example, if the waste water is saline or brackish water to be treated for use as portable water, the impurities may include metal ions such as $Na^+$, $K^+$, $Ca^{2+}$, $Mg^{2+}$, anions such as $HCO_3^-$, $CO_3^-$, $Cl^-$ and $SO_4^{2-}$ and organics such as carboxylic acids. If waste water is to be treated for high purity water applications such as for use in electronics manufacturing, the impurities will include those mentioned above in addition to other species such as boron, silica, and fulvic acids to name a few by way of example.

The water treatment process may comprise the step of supplying waste water to the chamber. The waste water may be from domestic sources such as sewage effluent or it may be from an industrial source such as a water which is the by-product of a refining process.

In one embodiment, the water treatment process comprises the step of seeding the waste water with bioactive seed material.

In one embodiment, the water treatment process comprises the step of growing the bioactive seed material while it is suspended in the waste water.

The volumetric concentration of the bioactive materials that are in granular form may be in the range selected from the group consisting of: at least 40% by volume; at least 50% by volume; at least 60% by volume; at least 70% by volume; at least 80% by volume; at least 90% by volume; at least 95% by volume; and at least 99% by volume.

The water treatment process may comprise the step of supplying oxygen-containing gas to the waste water. The step of supplying oxygen-containing gas to the waste water may be undertaken continuously or intermittently during the water treatment process.

The oxygen-containing gas may ensure that the bioactive seed material is suspended in the waste water and it may also assist in permitting the microorganisms of the bioactive seed material to undergo oxidative respiration. The oxygen-containing gas may be air. The supplying step may comprise passing the oxygen-containing gas through a diffuser located in the chamber. The diffuser may be located in the bottom of the chamber of the reactor.

In one embodiment, the water treatment process comprises the step of agitating the suspended material to at least partially inhibit deposition of particles on the membrane separator.

The agitating may be induced by said step of supplying oxygen-containing gas to the waste water. The step of supplying oxygen-containing gas to the waste water may be varied to promote or regulate an aerobic conditions, anoxic conditions, anoxic anaerobic conditions, and combinations thereof, in the waste water.

In yet another embodiment, the water treatment process may comprise the step of supplying an inert gas such as nitrogen to the waste water to promote or regulate an anaerobic anoxic, and/or anoxic conditions in the waste water. In anaerobic, anoxic and/or anoxic conditions in the waste water may promote the growth of slow-growing microorganisms.

In another embodiment, the agitating may be by mechanical agitation of the suspended material. The mechanical agitation may be undertaken by means of an impeller located within the chamber. The mechanical agitation may be used to promote or regulate anoxic and/or anaerobic conditions in the waste water.

The agitating step may comprise generating shear-induced flow regimes within the waste water. The shear-induced flow regimes may prevent growing particles from depositing onto the membrane separator, such as by binding, adsorption and/or precipitation of the growing microorganisms.

In one embodiment, oxygen-containing air is used to produce the shear-induced flow regimes. The superficial gas velocity of the air may be in the range selected from the group consisting of about $0.01$ cm·s$^{-1}$ to about $20$ cm·s$^{-1}$; about $0.05$ cm·s$^{-1}$ to about $20$ cm·s$^{-1}$; about $0.1$ cm·s$^{-1}$ to about $20$ cm·s$^{-1}$; about $0.5$ cm·s$^{-1}$ to about $20$ cm·s$^{-1}$; about $1$ cm·s$^{-1}$ to about $20$ cm·s$^{-1}$; about $1.5$ cm·s$^{-1}$ to about $5$ cm·s$^{-1}$, about $1.5$ cm·s$^{-1}$ to about $4$ cm·s$^{-1}$, about $1.5$ cm·s$^{-1}$ to about $3$ cm·s$^{-1}$; about $0.5$ cm·s$^{-1}$ to about $15$ cm·s$^{-1}$; about $0.5$ cm·s$^{-1}$ to about $10$ cm·s$^{-1}$; about $0.5$ cm·s$^{-1}$ to about $8$ cm·s$^{-1}$.

The agitating step may be for a time period selected from the group consisting of about 50 minutes to about 3 days, about 50 minutes to about 2 days, about 50 minutes to about 1 day, about 50 minutes to about twelve hours, about 50 minutes to about 500 minutes, about 120 minutes to about 400 minutes, about 200 minutes to about 300 minutes.

In one embodiment, the water treatment process comprises the step of passing the waste water through the membrane separator. In one embodiment, the membrane separator is provided in the chamber (i.e. a submerged membrane separator). In another embodiment, the membrane separator is provided outside of the chamber and is in fluid communication with the chamber, such as a sidestream membrane separator.

The passing step may be achieved by subjecting the waste water to a pressure force to drive water through the membrane separator. The pressure force may be applied by one or more water or vacuum pumps in fluid communication with the reactor chamber.

The step of passing the waste water through the membrane separator may be for a time period selected from the group consisting of about 50 minutes to about 3 days, about 50 minutes to about 2 days, about 50 minutes to about 1 day, about 50 minutes to about twelve hours, about 50 minutes to about 500 minutes, about 100 minutes to about 400 minutes, about 150 minutes to about 300 minutes, about 150 minutes to about 200 minutes.

The membrane separator may comprise a membrane in the form of a tube or sheet. Water that passes through the membrane is known as "permeate" and is removed from the membrane as a permeate stream. Water that does not pass through the membrane but is removed from the chamber of the reactor is known as "reject" and is removed from the chamber as a reject stream.

The membrane may be selective to particular chemical species in solution and therefore impurities in solution. Different chemical species have different molecule sizes, which results in different flux rates across the membrane with resultant chemical species selectivity. This membrane selectivity results in different concentrations of species reporting to the permeate water stream and the reject water stream. For example, in high purity water applications required for electronics manufacturing processes, the membrane may be selectively permeable to impurity species such as silica, boron or organic carbon so that there is a higher concentration of these species reporting to the reject stream compared to the permeate stream.

There may be provided multiple membrane separators within or outside of the chamber of the reactor.

In one embodiment, the water treatment process comprises the step of removing bioactive particles of a selected size range from the chamber whilst retaining bioactive particles of a selected granular size within the chamber. In one embodiment, the water treatment process comprises the step of removing bioactive particles that have not settled under gravity in the water after a settling time period. It should be realised that the removing step may involve removal from the chamber of some granular particles that have not settled under gravity in the water after the settling time period.

The step of retaining bioactive particles of a selected granular size within the chamber may comprise settling bioactive granular size particles adjacent to the bottom of the chamber. The settling step may comprise ceasing agitation of the waste water in the chamber for a time to allow said bioactive granular size particles to settle toward the bottom of the chamber under gravity. The settling time will be dependent on the desired particle size of the bioactive granular size particles and the Reynolds number of the waste water. Exemplary settling times are selected from the group consisting of about 30 seconds to about 3 hours, about 30 seconds to about 2 hours, about 30 seconds to about 1 hour, about 30 seconds to about 1800 seconds, about 30 seconds to about 1000 seconds, about 30 seconds to about 500 seconds, 30 seconds to about 300 seconds, 30 seconds to about 200 seconds, 30 seconds to about 100 seconds, 30 seconds to about 50 seconds.

The bioactive granular size particles may be in the size range selected from the group consisting of about 50 µm to about 10 mm, about 50 µm to about 8 mm, about 50 µm to about 6 mm, about 50 µm to about 4 mm, about 50 µm to about 2 mm, about 50 µm to about 10 mm, about 100 µm to about 10 mm, 500 µm to about 10 mm, about 1000 µm to about 10 mm, about 100 µm to about 2 mm, about 200 µm to about 2 mm, about 400 µm to about 1.5 mm, and about 600 µm to about 1.5 mm.

The discharge particle size may be any size less than the bioactive granular size particles. It should, however, be realised that some particles that fall within the granular size range may be discharged from the reactor with the discharge sized particles. Exemplary discharge particle sizes are particles having a size less than a size selected from the group consisting of about 50 µm, about 100 µm, about 500 µm, and about 1000 µm.

The step of removing particles of a selected size range may comprise, after the settling step, discharging waste water from the chamber containing suspended particles. The suspended particles are located above the settled granular size particles and are preferably the size range of the bioactive granular size particles.

Other size separation processes may be used to remove particles of a selected particle size whilst retaining bioactive particles of a selected granular size within the chamber. For example, a cyclone separator or mesh filters can be used to separate undersized particles from over-sized particles.

In one embodiment, there is provided a method of forming bioactive granules for use in a water treatment reactor comprising a chamber that is in fluid communication with a membrane separator. At start-up, the reactor chamber is filled with waste water and then seeded with the bioactive seed material. The reactor may then be operated in batch-cycle according to the following steps:

(i) Growing the microorganisms contained within the bioactive seed material to form larger particles. Optionally, the growing comprises injecting oxygen-containing gas into the waste water.

(ii) Agitating the suspended material during the growing step (i) to inhibit deposition of particles on the membrane separator.

(iii) Filtering permeate from the particles by passing water through the membrane. The step of passing the waste water through the membrane separator may be undertaken for a time to withdrawn a selected volume of permeate to achieve a "target volumetric exchange ratio". In one embodiment, the target volume exchange ratio is the volume of water removed from the reactor as permeate and reject in a single operating cycle of the reactor relative to the total volume of the reactor. In one embodiment, the target volumetric exchange ratio is selected from the group consisting of about 20% to about 90%, about 30% to about 80%, about 40% to about 70%, and about 45% to about 60%.

(iv) Settling granular sized bioactive particles by stopping the agitating step (ii) and/or stopping the supply of gas injected into the reactor chamber. The granular sized bioactive particles are allowed to settle at the bottom of the chamber.

(v) Discharging a portion of the supernatant from above the settled particles to remove under-sized particles that are suspended in solution.

(vi) Optionally, the system may be left at idle at the end of the discharging step.

After a complete cycle has been performed according to steps (i) to (vi), the full cycle may be repeated to continue to grow the bioactive granular sized particles.

It should be noted that in some embodiments, the step (i) may be omitted after the first batch cycle so that the existing grown bioactive granular sized particles continue to grow in propagate more granular particles. In other embodiments, a fresh supply of bioactive sludge may be supplied to the reactor to augment the growth of the particles.

The reactor may comprise a waste water conduit in fluid communication with the chamber of the reactor.

The reactor may comprise a reject stream conduit in fluid communication with the chamber of the reactor. The reject conduit may be used to remove the reject stream of water from the chamber that has not passed through the membrane separator.

The reactor may comprise a permeate stream conduit in fluid communication with the membrane separator. The permeate stream conduit may be used to remove water from the membrane separator after it has passed through the membrane separator.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

BEST MODE

Non-limiting examples of the invention, including the best mode, will be further described in greater detail by reference to specific example, which should not be construed as in any way limiting the scope of the invention.

Figure 1:
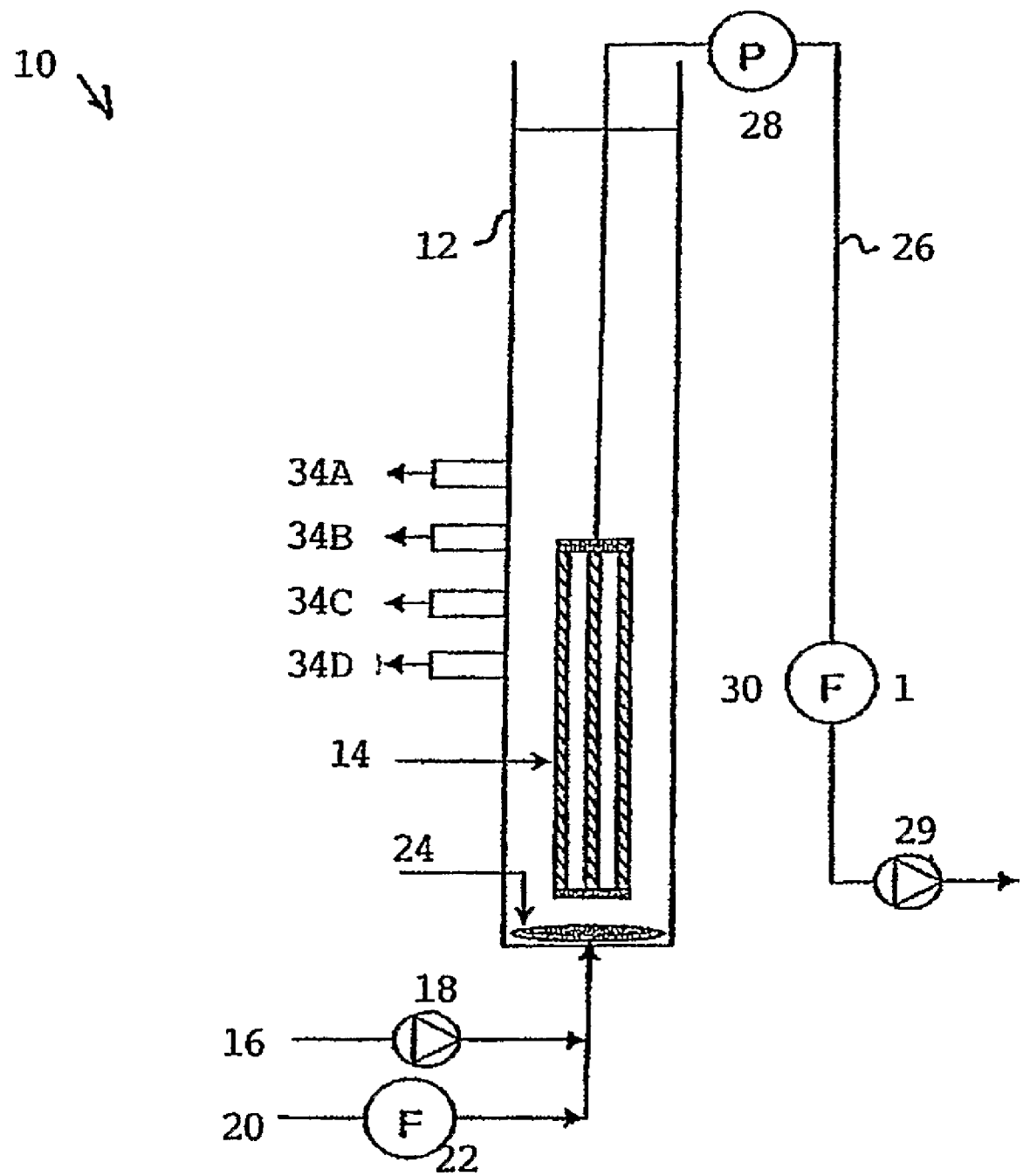
FIG. 1 is a schematic diagram of a granulating membrane bioreactor (GMBR) that utilised the water treatment process of a disclosed embodiment.

Referring to FIG. 1, there is shown a granulating membrane bioreactor (GMBR) 10 that operates according to a disclosed embodiment of a water treatment process. The GMBR 10 is a column-type reactor (height 1.2 m; diameter 6 cm) with a working volume of 2.3 L. The GMBR 10 comprises a chamber 12 containing bioactive granules suspended in waste water therein. The bioactive granules containing microorganisms capable of removing one or more impurities from the waste water.

The GMBR 10 also comprises a membrane separator in the form of submerged membrane module 14. The submerged membrane module 14 consists of twenty 40 cm long hollow fiber membranes, each membrane having a nominal pore size of 0.1 µm and a working surface area of 0.025 m². The membrane module was operated using a single dead end filtration mode. One end of the module was sealed while permeate was withdrawn from the other end.

The GMBR 10 also comprises a waste water inlet conduit 16 and a waste water feed pump 18 for filling the chamber 12 with waste water.

The GMBR 10 also comprises an aeration inlet conduit 20 for transmission of air to the chamber 12. A flow meter 22 is provided on the inlet conduit 20 for indicating the flow rate of air therethrough. The inlet conduit connects to a diffuser 24, located at the bottom of the chamber 12.

The GMBR 10 also comprises permeate discharge conduit 26 which discharges permeate from the membrane module 14. A pressure gauge 28 and a flow meter 30 are provided on the discharge conduit 26 to respectively measure the gauge pressure and flow rate of permeate as it is discharged from the membrane module 14 by pump 29. The pump 29 can also be used to create a vacuum within the chamber 12 of the membrane module 14 and thereby drive water through the membranes of the membrane module 14.

The GMBR 10 also comprises multiple reject discharge conduits (34A, 34B, 34C, 34D) which vary in chamber height. The reject discharge conduits (34A, 34B, 34C, 34D) allow the operators of the GMBR 10 to selectively discharge suspended particles of different sizes after settling. For example, conduit 34A is above conduit 34B, and therefore, there will be smaller particle sizes flowing from conduit 34A compared to conduit 34B after settling as will be described further below.

Figure 2:
FIG. 2 is a schematic diagram of the operation of the GMBR of FIG. 1.
Figure 2:
Figure 2:
Figure 2:
Figure 2:
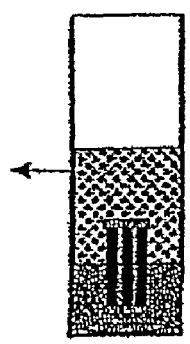
Figure 2:
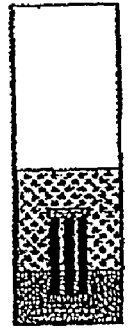

Referring now to FIG. 2, there is a schematic diagram of the operation of the GMBR 10. The operation may be described by the following steps:

Step 1—("fill"): The pump 18 supplies waste water to the chamber 12 via conduit 16.

Step 2—("react"): Air is supplied to the chamber 12 via diffuser 24. The diffuser 24 disperses air bubbles at an airflow rate of 3.5 L·min$^{-1}$, which is equivalent to a superficial gas velocity of 2 cm·s$^{-1}$. The oxygen within the air cause the biomass to undergo oxidative respiration while under a shear-induced fluid flow regime.

Step 3—("react and filter"): water is gradually withdrawn of from the chamber 12 by filtration through the submerged membrane module 14 via conduit 26 under the action of pump 32.

Step 4—("settle"): the pump 18 is turned off to turn off the air supply so that air stops flowing through the diffuser 24. The time period for settling is sufficient to allow bioactive particles of a selected granular size to settle below one of discharge conduits (34A,34B,34C,34D)

Step 5—("discharge"): a portion of the supernatant is discharged one of discharge conduits (34A,34B,34C,34D). This means that any suspended solid particles (undersize) will be removed from the chamber 12.

Step 6—("idle"): The GMBR 10 is left at rest at the end of the cycle.

At the end of the step 6, the reactor operation returns to step 1 and a new cycle begins.

Example 1

The GMBR 10 was inoculated with granular sludge having an initial biomass concentration of 4 g MLSS $L^{-1}$ and operated sequentially in 4 h cycles as described above with reference to Steps 1-6. The reactor operated in six cycles per day with 3 min of filling (Step 1), 237 min of aeration (Step 2), 177 min of reacting and filtering (Step 3), 40 s of settling (Step 4), 1 minute of discharging (Step 5) and 1 minute 20 seconds of idling (Step 6).

The GMBR 10 was fed with pre-treated municipal wastewater (that has been allowed to settle for two hours) having an organic loading rate that ranged from 0.23 to 2.7 g COD $L^{-1}$ $d^{-1}$ and that averaged 2 g COD $L^{-1}$ $d^{-1}$.

Filling and aeration (Steps 1 & 2) commenced at the same time at the beginning of each cycle. Membrane filtration (step 3) commenced 60 min after the start of aeration. A permeate stream equivalent to ⅜ of the reactor working volume was removed by membrane filtration.

Supernatant equivalent to ⅛ of the reactor working volume was removed by direct discharge (Step 5) through a discharge port after the settling step (reject stream).

The total amount of wastewater removed per 4 h cycle was equivalent to 50% of the reactor working volume, giving a volumetric exchange ratio of 50% and a hydraulic retention time of 8 hours.

Figure 3:
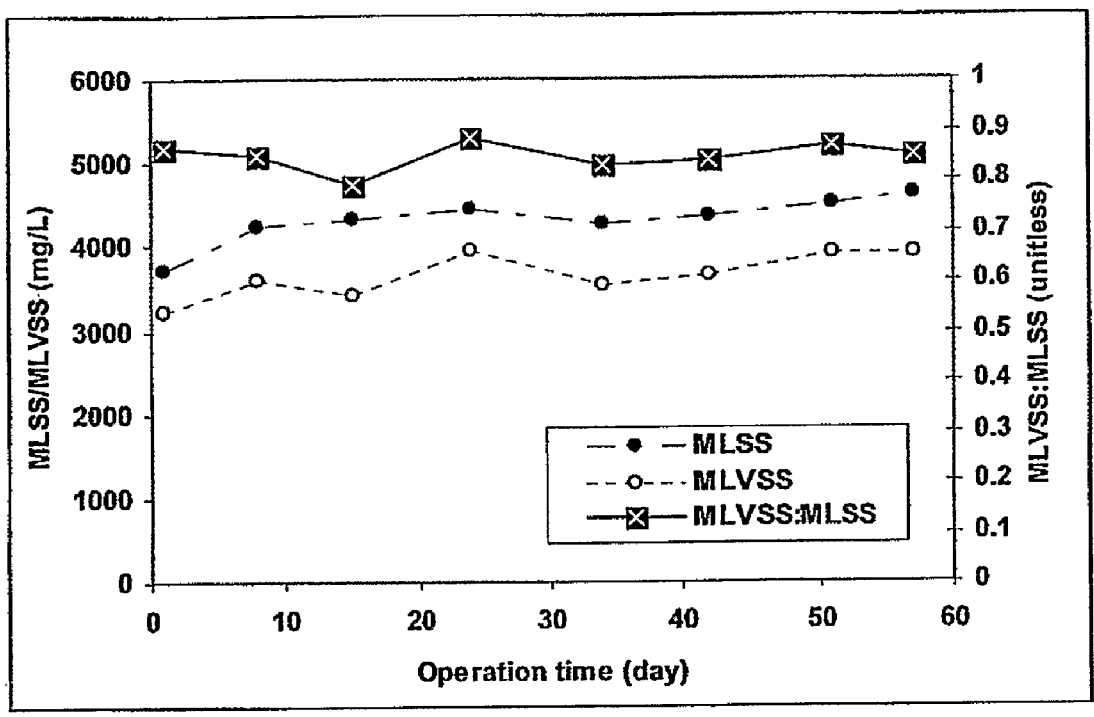
FIG. 3 is a graph showing the changes in Mixed Liquor Volatile Suspended Solids (MLVSS), Mixed Liquor Suspended Solids (MLSS), and the ratio of MLVSS:MLSS in the GMBR over time.
Figure 4:
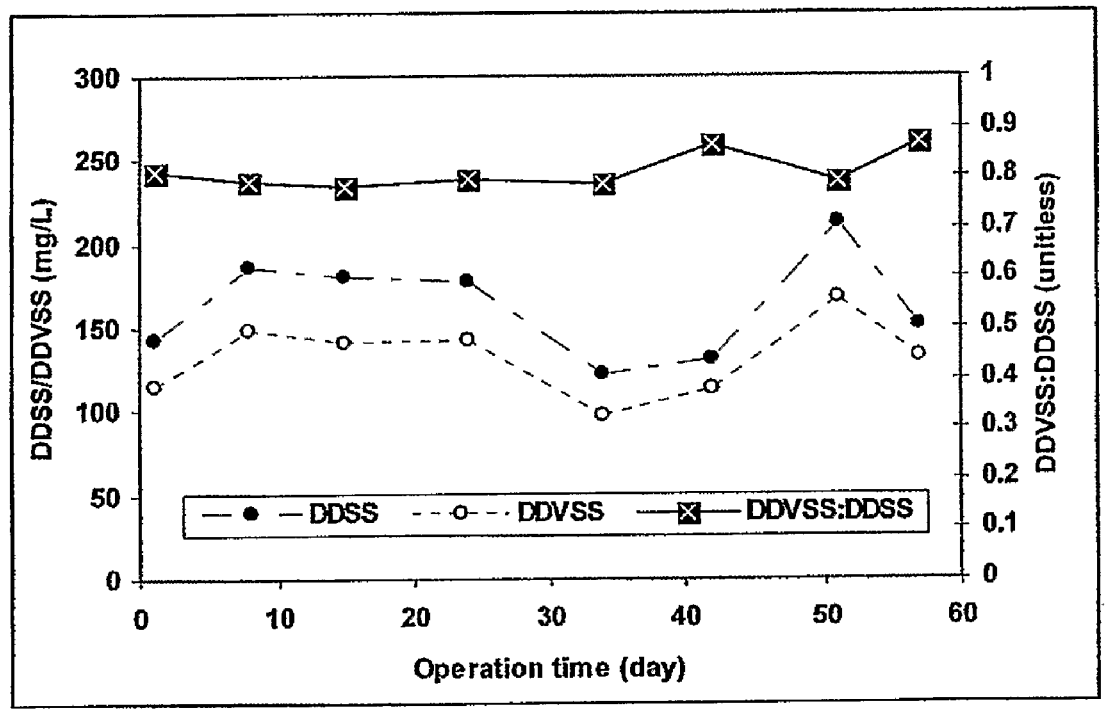
FIG. 4 is a graph showing the changes in Direct Discharge Suspended Solids (DDSS), Direct Discharge Volatile Suspended Solids (DDVSS), and the ratio of DDVSS:DDSS in the GMBR over time.
Figure 5:
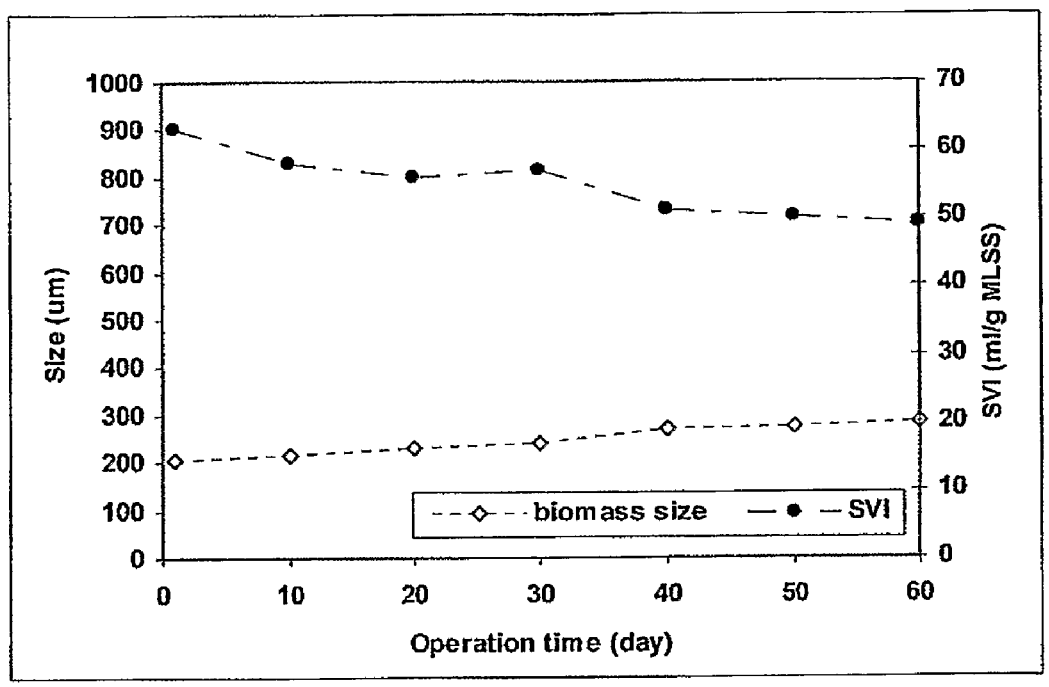
FIG. 5 is a graph showing mean particle diameter of the bioactive granular-sized particles and Sludge Volume Index (SVI) over time in the GMBR reactor.

The GMBR reactor 10 was tested on raw sewage wastewater using pretreated (settled) sewage as influent feed. No significant fouling was observed during 57 days of continuous operation. As can been seen from FIG. 3, a stable biomass concentration of 4.5 g MLSS $L^{-1}$ was sustained towards the end of the operation. As shown in FIG. 4, DDSS (direct discharge suspended solids) in the MBR with pretreated sewage was less than 200 mg $L^{-1}$ and averaged 165 mg $L^{-1}$ during the last two weeks of operation. As shown in FIG. 5, the biomass size was 0.28 mm and the SVI was 49 mL $g^{-1}$ at the end of the operating period.

Figure 6:
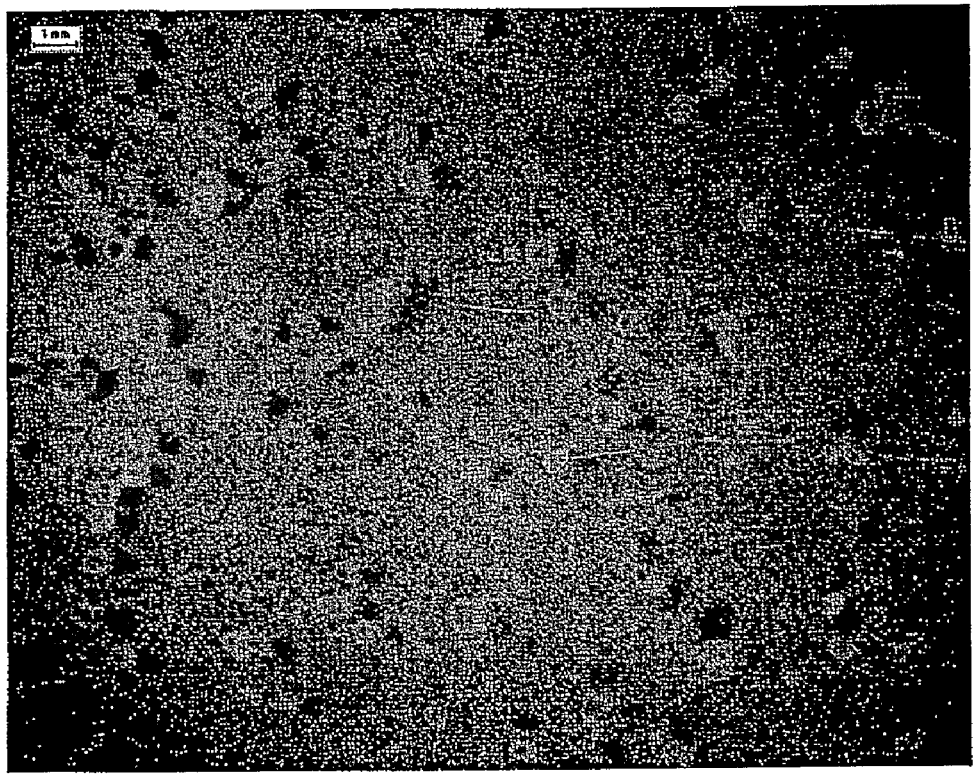
FIG. 6 shows a stereomicroscope image of bioactive granular-sized particles within the reactor after 50 days of operation of the GMBR.

A stereomicroscopic image of the biomass is shown in FIG. 6.

Figure 7:
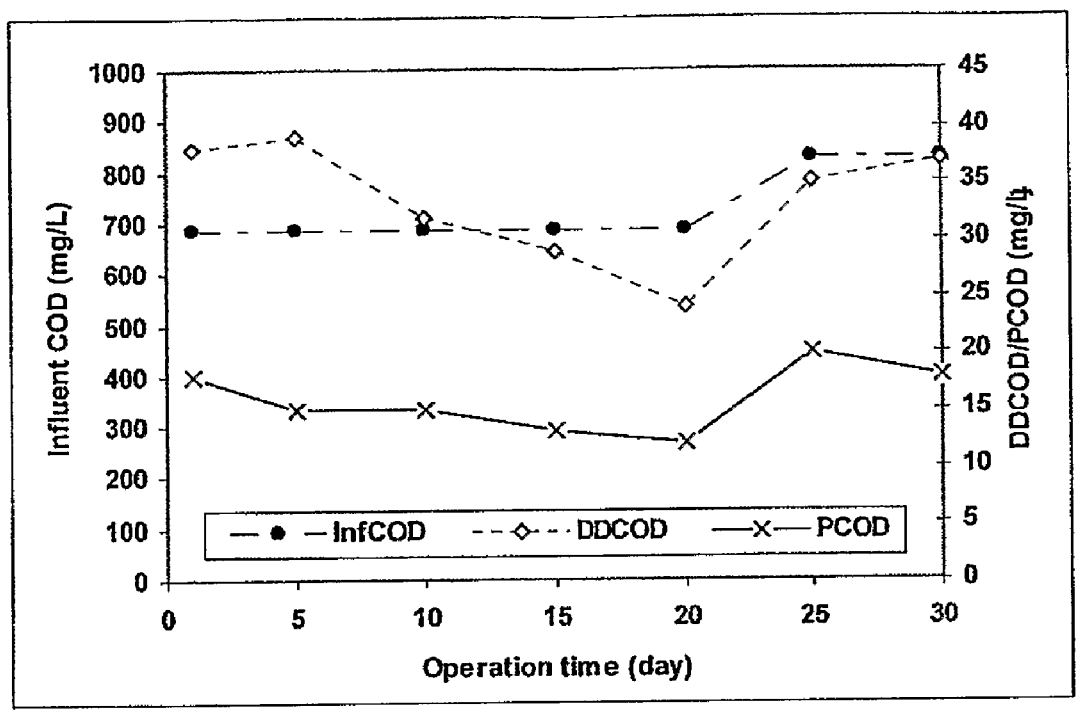
FIG. 7 is a graph showing the changes in chemical oxygen demand (COD) in influent (InfCOD), COD in direct discharge of the reject stream (DDCOD), and COD in direct discharge of the permeate stream (PCOD) over a 30 day operating period.

Referring to FIG. 7, COD concentrations in the direct discharge (reject stream) and the permeate stream stabilized at 35 mg $L^{-1}$ and below 20 mg $L^{-1}$, respectively, towards the end of the operating period.

Figure 8:
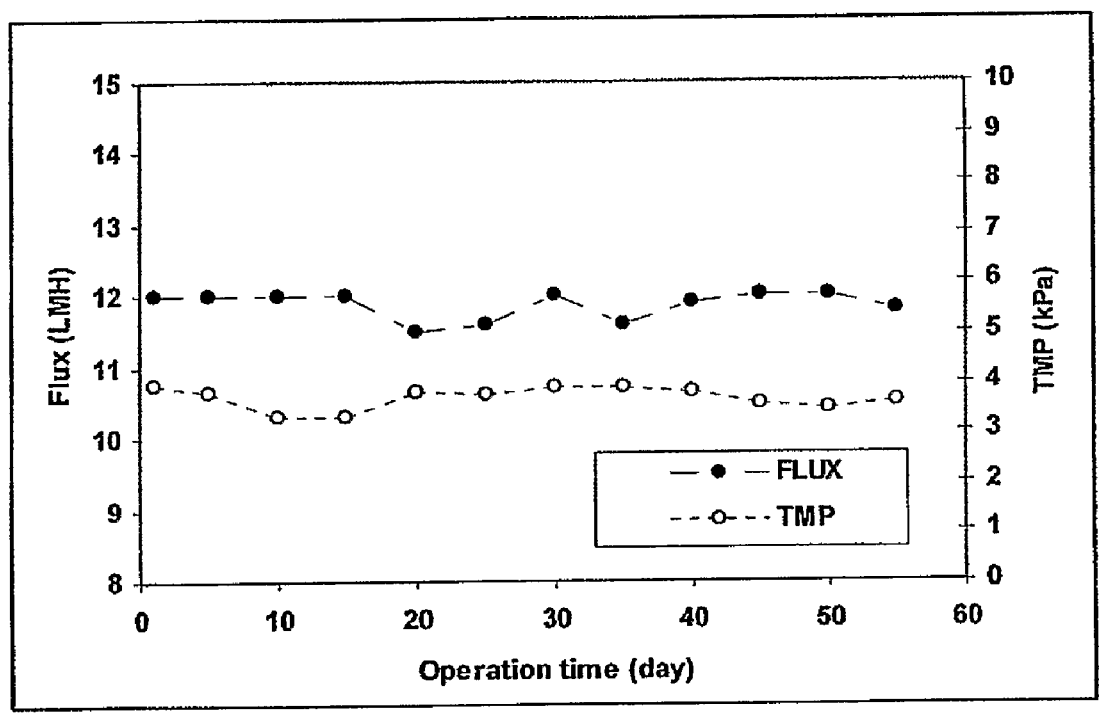
FIG. 8 is a graph showing transmembrane pressure (TMP) and membrane flux data (FLUX) of the GMBR over a 55 day operating period.

FIG. 8 shows the profile of transmembrane pressure (TMP) and membrane flux during the operation. Membrane filtration was performed by application of vacuum pressure on the submerged membrane module 14 by pump 29 to achieve a desired TMP. A stable flux of 12 LMH was sustained without any substantial increase in TMP, indicating that membrane fouling was not significant during the operating period.

Example 2

A second test of the GMBR 10 was undertaken to evaluate the characteristics of the granular sludge at different hydraulic retention times (HRT) of 4 hours and 8 hours.

A synthetic wastewater with sodium acetate as carbon source was prepared with the following composition ($gl^{-1}$): acetate 2.562, $NH_4Cl$ 0.2, $K_2HPO_4$ 0.045, $CaCl_2.2H_2O$ 0.03, $MgSO_47H_2O$ 0.025 and $FeSO_4.7H_2O$ 0.02.

The synthetic wastewater media was dosed proportionally with the following micronutrients ($mgL^{-1}$): $H_3BO_3$ 0.05, $ZnCl_2$ 0.05, $CuCl_2$ 0.03, $MnSO_4.H_2O$ 0.05, $(NH_4)_6.Mo_7O_{24}.4H_2O$ 0.05, $AlCl_3$ 0.05, $CoCl_2$-$6H_2O$ 0.05 and $NiCl_2$ 0.05.

The synthetic wastewater had a chemical oxygen demand (COD) of 2,000 mg COD $L^{-1}$. The synthetic wastewater was appropriately diluted to 4/3 g COD $L^{-1}$ and fed into the reactor to give an organic loading rate of 4 kg COD $m^{-3}d^{-1}$.

The GMBR 10 was initially operated and stabilized at a HRT of 8 hours and an organic loading rate (OLR) of 4 g COD $L^{-1}$ $d^{-1}$. The HRT was then adjusted to 4 hours with OLR unchanged. The GMBR 10 was operated in a sequencing batch mode with membrane filtration commencing at 30 min and 1 hour after the start of aeration for HRTs of 4 and 8 hours, respectively. The operation scheme is outlined in Table 1 below.

TABLE 1

Operation scheme in each cycle at different HRTs

| HRT (hrs) | Cycle time (min) | Filling (min) | Aeration (min) | Settling (sec) | Discharge (min) | Filtration (min) | Influent COD (mg $L^{-1}$) |
|---|---|---|---|---|---|---|---|
| 4 | 120 | 3 | 117 | 40 | 1 | 87 | 667 |
| 8 | 240 | 3 | 237 | 40 | 1 | 177 | 1333 |

Desludging was performed during the course of GMBR 10 operation to minimize the amount of suspended solids in the direct discharge (reject stream). For instance, in the case of a HRT of 4 hours, desludging was implemented from day 25 in order to maintain an MLSS of approximately 3.5 g $L^{-1}$ and an F/M ratio (food-to-microorganism ratio) of 1.14 g COD g $MLSS^{-1}$ $days^{-1}$.

Standard laboratory methods (APHA 1998) were used to analyze pH, COD, mixed liquor volatile suspended solids (MLVSS), mixed liquor suspended solids (MLSS), dissolved oxygen and sludge volume index (SVI).

Biomass size was measured using either a laser-based particle size analyzer (Malvern Mastersizer 2600 from Malvern Instruments, Malvern, Worcestershire, United Kingdom) or a stereomicroscope (Olympus SZX9, Japan) with Image Pro Pius software (Media Cybernetics, version 4, USA).

Figure 9:
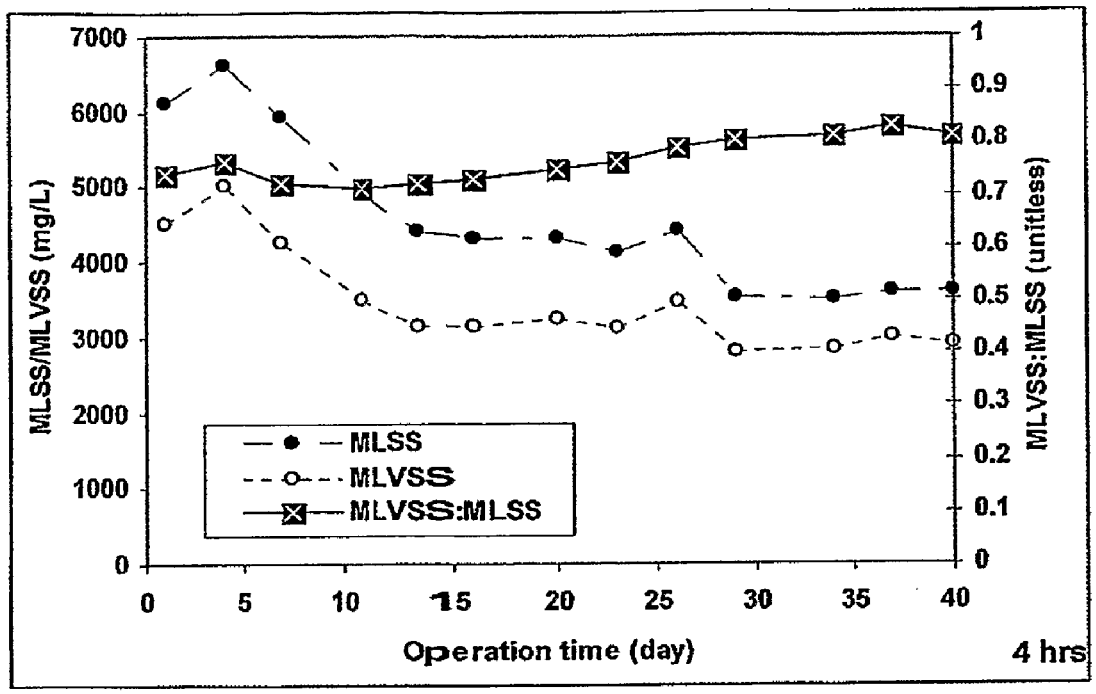
FIG. 9 is a graph showing the changes in MLSS, MLVSS and the ratio of MLVSS:MLSS over a hydraulic retention time (HRT) of 4 hours over a 40 day operating period.
Figure 10:
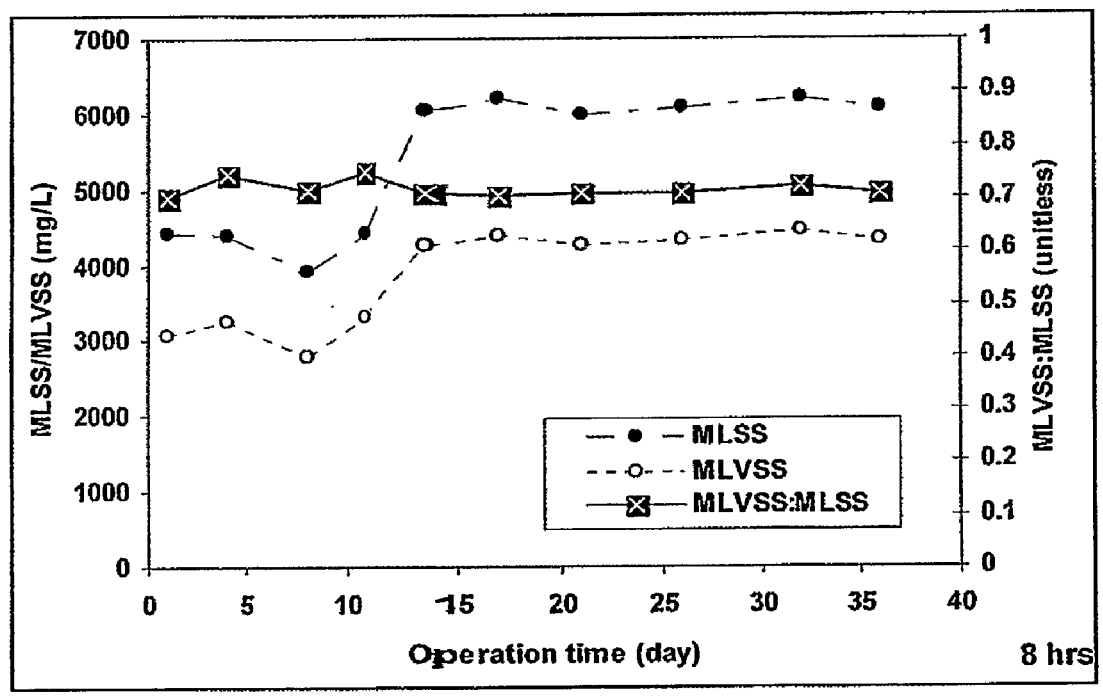
FIG. 10 is a graph showing the changes in MLSS, MLVSS and the ratio of MLVSS:MLSS over a hydraulic retention time (HRT) of 8 hours over a 40 day operating period.

The HRTs of 4 and 8 hours resulted in stable performance with minimal membrane fouling, and the biomass concentrations stabilized after four weeks of operation at 4.3 and 6.1 g MLSS $L^{-1}$ (refer to FIGS. 9 and 10).

Figure 11:
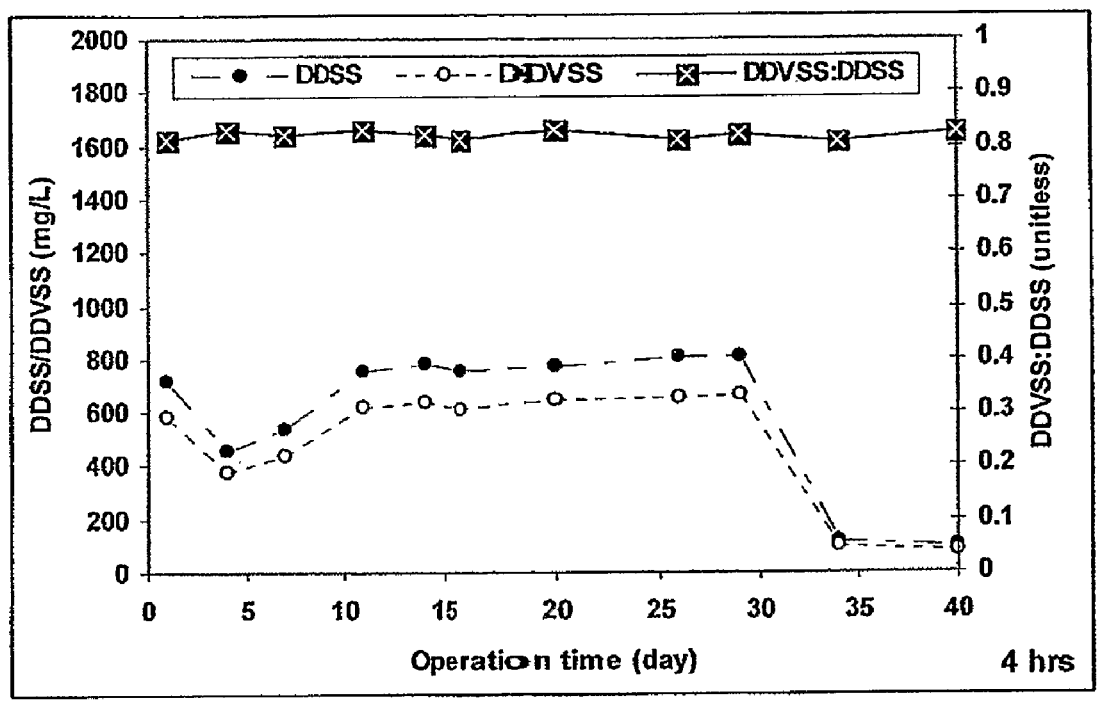
FIG. 11 is a graph of suspended solids showing the changes in DDSS, DDVSS and the ratio of DDVSS:DDSS over a HRT in the GMBR of 4 hours over a 40 day operating period.
Figure 12:
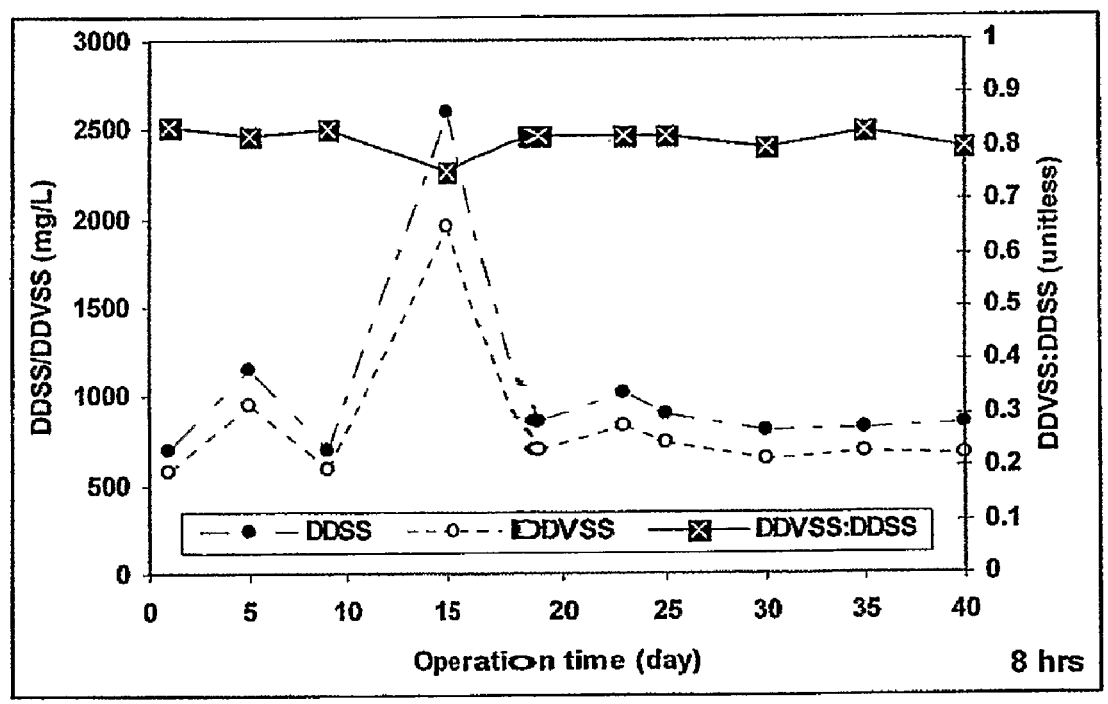
FIG. 12 is a graph of suspended solids showing the changes in DDSS, DDVSS and the ratio of DDVSS:DDSS at a HRT in the GMBR of 8 hours over a 40 day operating period.
Figure 13:
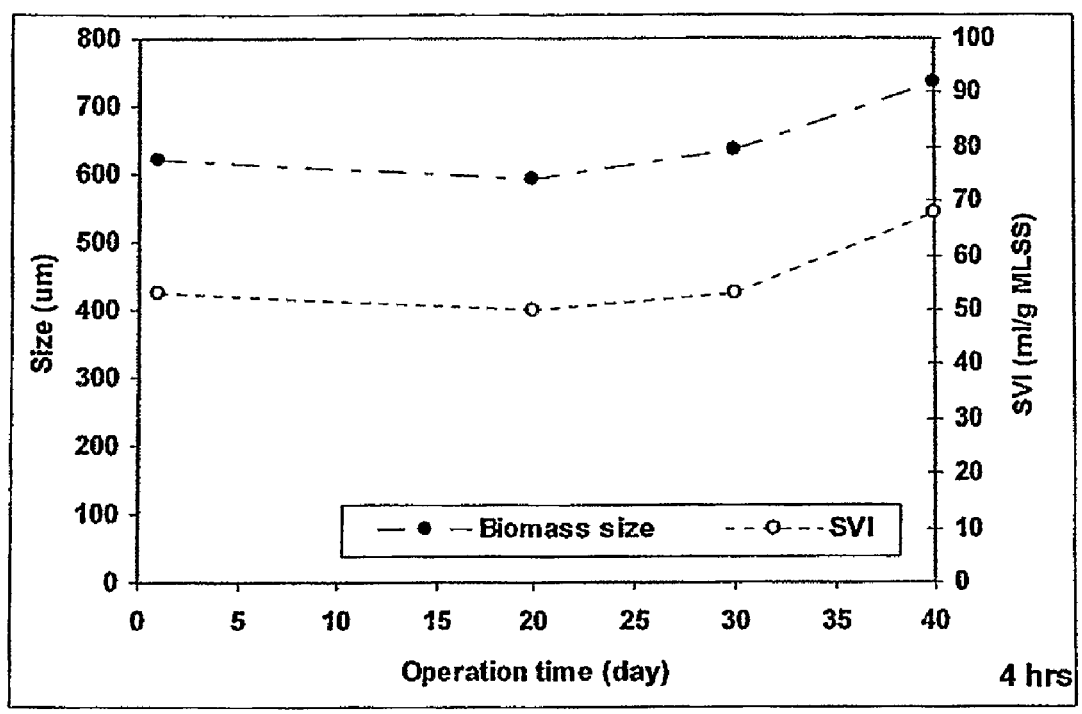
FIG. 13 is a graph showing mean particle diameter of the bioactive granular-sized particles and SVI at a HRT in the GMBR of 4 hours over a 40 day operating period.
Figure 14:
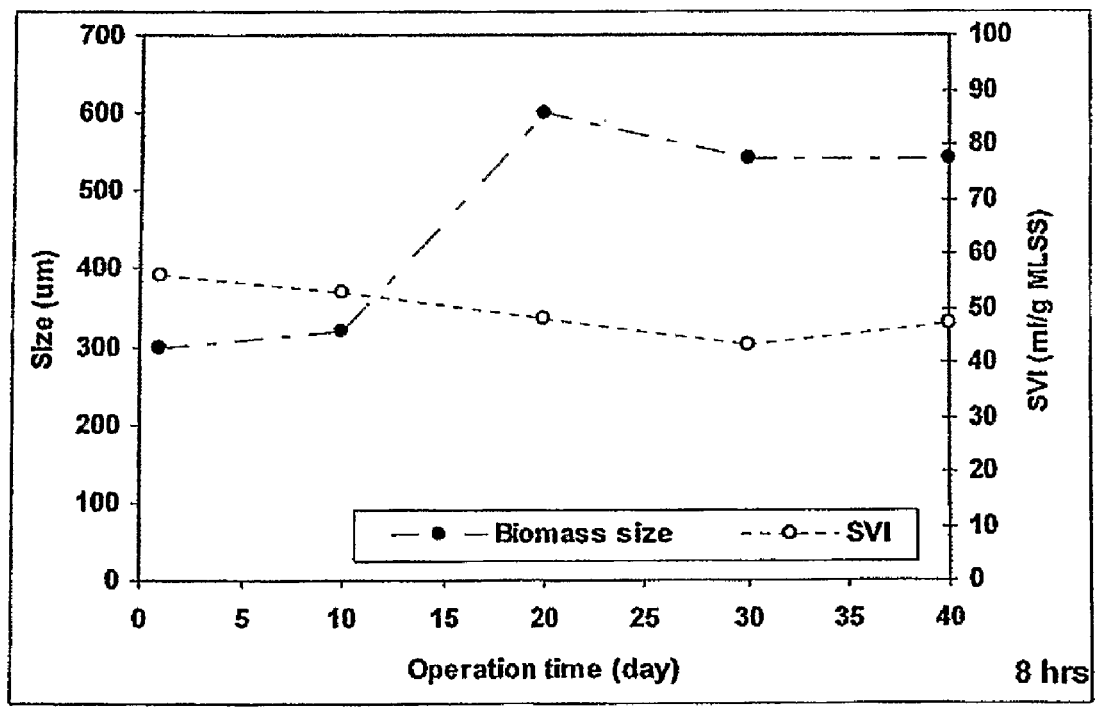
FIG. 14 is a graph showing mean particle diameter of the bioactive granular-sized particles and SVI at a HRT in the GMBR of 8 hours over a 40 day operating period.

FIGS. 11 and 12 show the direct discharge suspended solids concentrations at the two HRTs. DDVSS concentrations were 112 mg $L^{-1}$ and 810 mg $L^{-1}$ at HRTs of 4 and 8 hours, respectively, during the last two weeks of operation. End-of-operation biomass sizes and SVI values were 0.73 mm and 0.54 mm, and 68 and 47 mL $g^{-1}$ at HRTs of 4 and 8 hours, respectively (refer to FIGS. 13 and 14).

Figure 15:
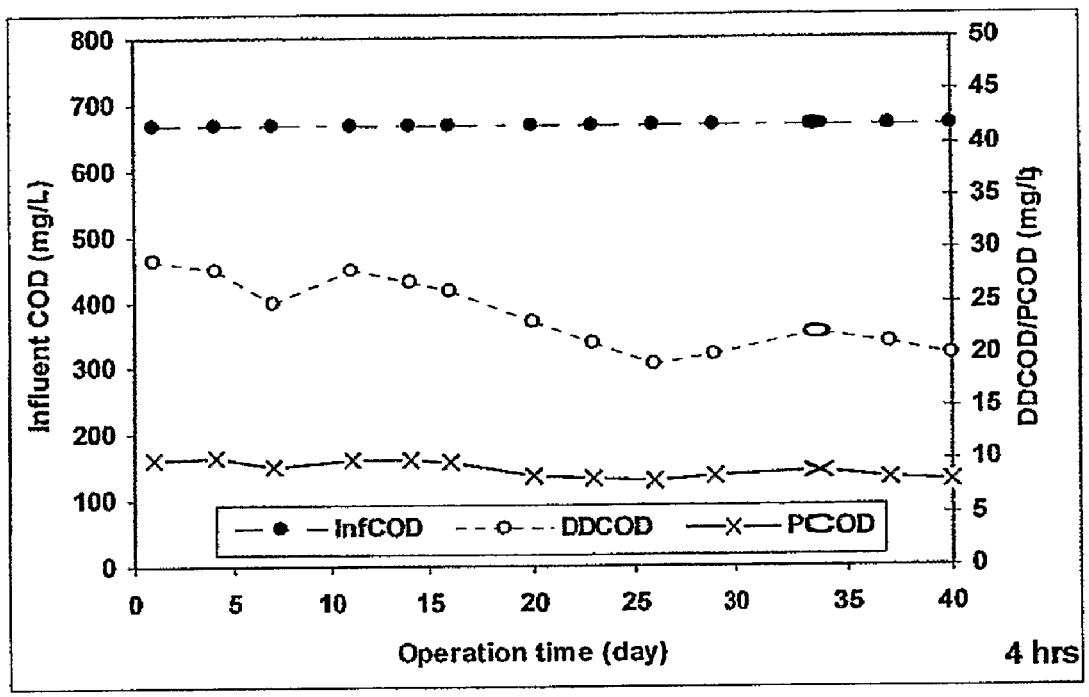
FIG. 15 is a graph showing the InfCOD, DDCOD and PCOD at a HRT in the GMBR of 4 hours over a 40 day operating period.
Figure 16:
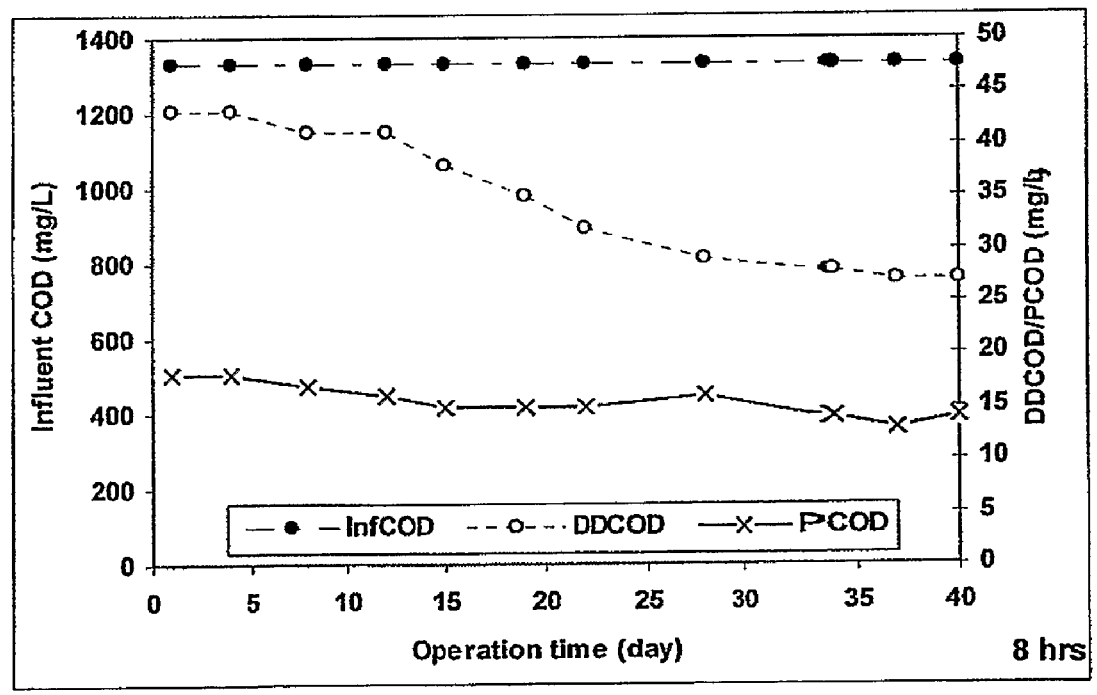
FIG. 16 is a graph showing the InfCOD, DDCOD and PCOD at a HRT in the GMBR of 8 hours over a 40 day operating period.

End-of-operation COD concentrations in the direct discharge were 20 mg $L^{-1}$ and 27 mg $L^{-1}$ at HRTs of 4 and 8 hours, respectively (refer to FIGS. 15 and 16). End-of-operation COD concentrations in the permeate were 8 and 14 mg $L^{-1}$, at HRTs of 4 and 8 hours, respectively (refer to FIGS. 15 and 16).

Figure 17:
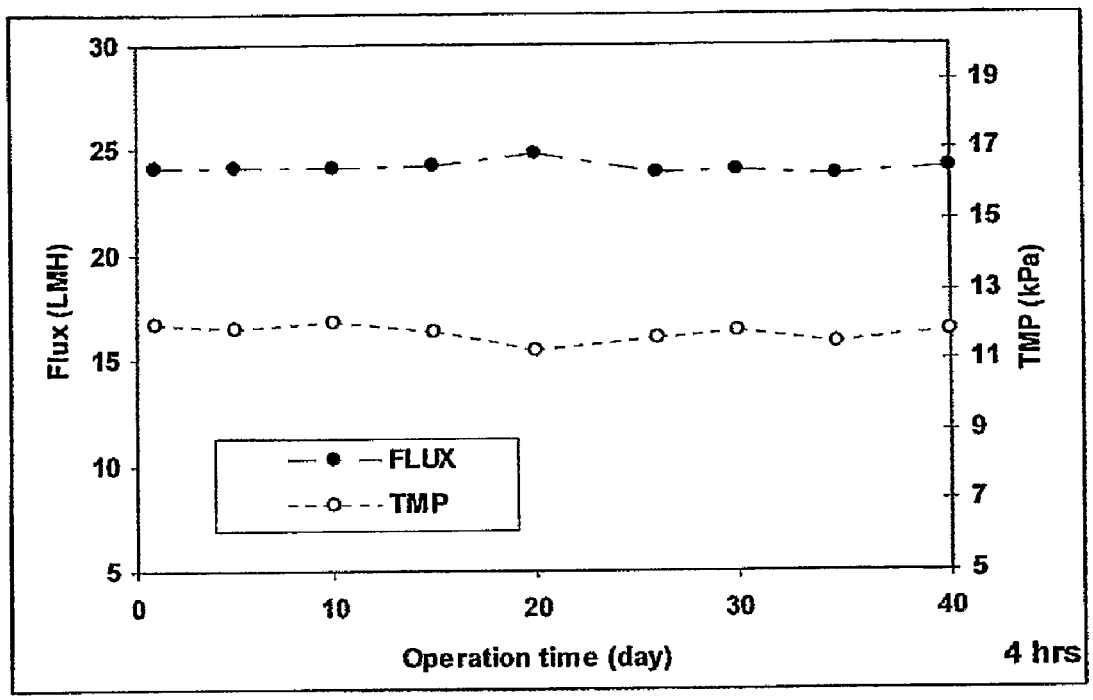
FIG. 17 is a graph showing TMP and FLUX at a HRT in the GMBR of 4 hours over a 40 day operating period.
Figure 18:
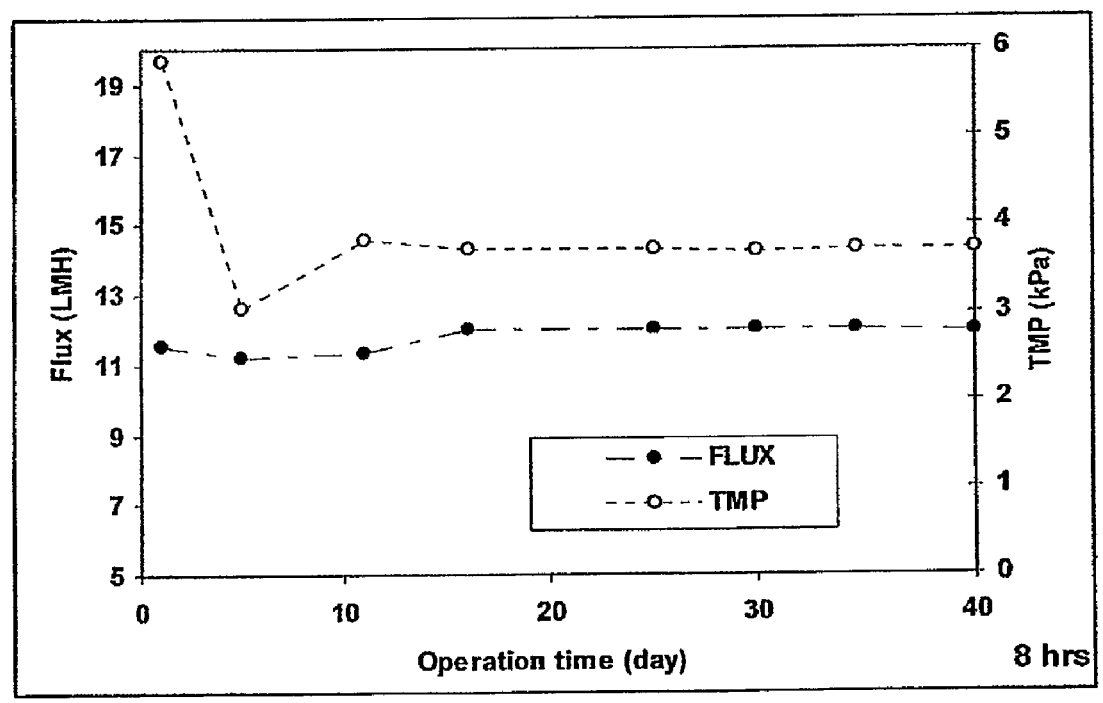
FIG. 18 is a graph showing TMP and FLUX at a HRT in the GMBR of 8 hours over a 40 day operating period.

FIGS. 17 and 18 depict the membrane filtration performance at different HRTs. Stable filtration fluxes were recorded at the HRTs of 4 and 8 hours, indicating that membrane fouling was minimal or absent.

Table 2 below shows the steady-state values of key parameters at the two HRTs, including mean biomass size, soluble COD of permeate and DD, and COD removal efficiency of permeate and critical flux.

TABLE 2

Key parameters of MBR operation at different HRTs

| Key parameters | HRT (hours) | |
|---|---|---|
| | 4 | 8 |
| Mean biomass size (mm) | 0.63 | 0.58 |
| Soluble COD of permeate (mg $L^{-1}$) | 9 ± 0.8 | 15 ± 1.6 |
| Permeate-based COD removal efficiency (%) | 98.6 ± 0.1 | 98.8 ± 0.1 |
| Soluble COD in DD (mg $L^{-1}$) | 24 ± 3.4 | 34.9 ± 6.2 |
| Critical flux (LMH) | 90 | 80 |

It can be seen from Table 2 that the permeate-associated COD removal efficiencies exceeded 98.6% at HRTs of 4 and 8 hours, and high critical fluxes in excess of 80 LMH were achieved.

In summary, satisfactory reactor performance was achieved at the HRTs of 4 and 8 hours tested.

It is believed from the above described data that the successful formation and/or maintenance of granular biomass particles in the GMBR 10 was achieved by a repetitive selection for sludge particles. Accordingly, the operation of the GMBR 10 as outlined above ensures that light and dispersed particles are washed out, while heavier components are retained in the reactor system. The selection pressures that drive the formation and retention of granular biomass particles can collectively be classified as microbial and/or hydraulic in nature. The GMBR 10 operates in a sequential batch mode of filling, reaction, filtering, settling, discharging and idling. As a result, the microorganisms growing in the GMBR system are subject to a repetitive selection process of periodical operation cycles.

It is believed that the settling of mixed liquor and discharge of supernatant within the GMBR 10 operating cycle serves as important factors in promoting the development of granular biomass. However, other operating, environmental and physiological conditions such as microbial starvation and hydrodynamic shear and flow pattern in the reactor can also contribute to the development of granular biomass in the GMBR.

In order to verify the effect of settling and discharge on the development of granular biomass particles in the GMBR 10, the GMBR 10 was inoculated with granular biomass and was operated without any settling and discharge steps (Step 4 and Step 5). Instead, permeate that was equivalent to ½ of the reactor working volume was removed via membrane filtration.

Figure 19:
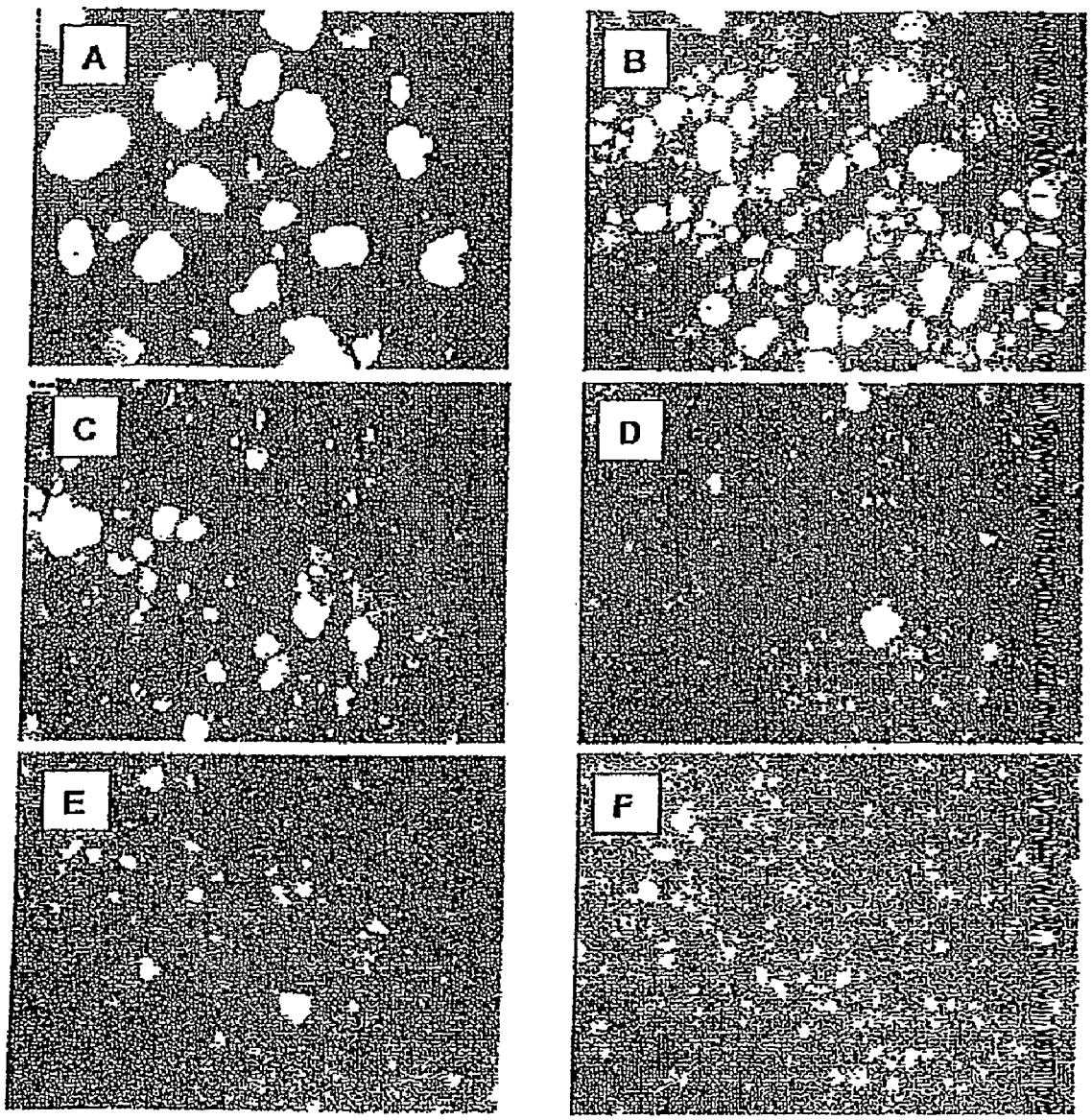
FIGS. 19(A-F) show stereomicroscope images of the disintegration of the granular biomass without settling and discharging steps at: 9(A) 0 days, 9(B) 5 days, 9(C) 10 days, 9(D) 15 days, 9(E) 20 days, and 9(F) 20 days.

FIG. 19 shows stereomicroscope images of the reactor biomass and demonstrates that severe disintegration of the biomass took place when the GMBR was operated without any settling and discharging steps.

Figure 20:
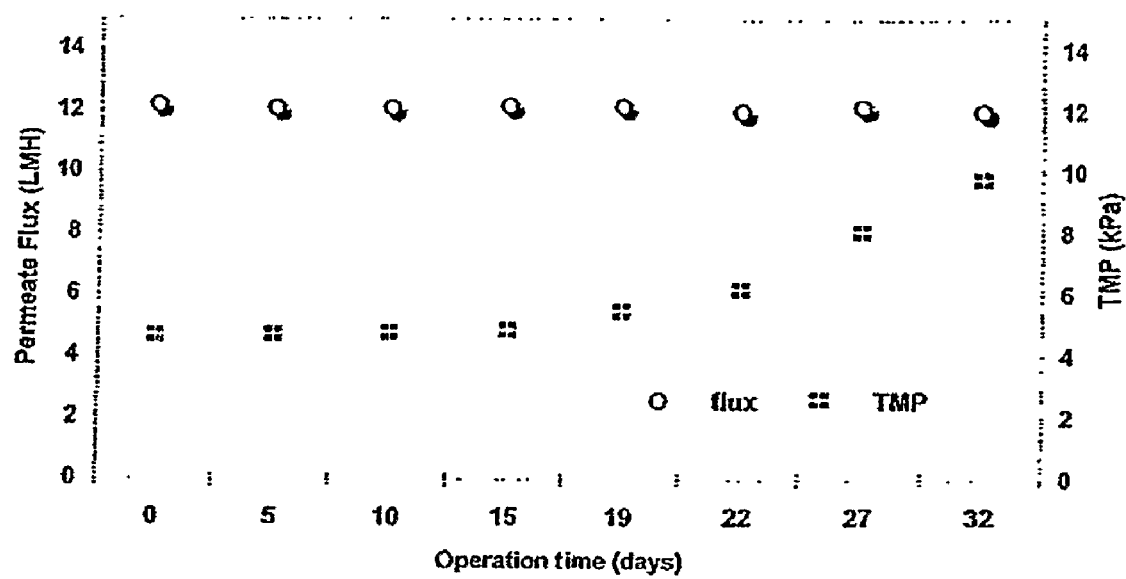
FIG. 20 is a graph showing transmembrane pressure (TMP) and membrane flux data when the GMBR was operated without any settling and discharging steps.

FIG. 20 shows the profiles of transmembrane pressure (TMP) and membrane flux when the GMBR was operated without any settling and discharging steps. Membrane filtration was performed by application of vacuum pressure on the submerged membrane module to achieve a steady-state flux of approximately 12 LMH. This was accompanied by a rapid and significant increase in TMP, from 4.7 kPa initially to approximately 10 kPa (and rising) after several weeks of operation. This indicates that severe fouling of the membranes was taking place. This severe deterioration in membrane performance is likely caused by the disintegrated biomass, which released large amounts of foulant species, such as lysed cells, extracellular polymeric substances (EPS) and soluble microbial products (SMP), into the wastewater suspension. These foulant species would swiftly fill up the pores and passages in the membranes and cause a significant loss in membrane filterability.

APPLICATIONS

The disclosed embodiments provide a new method for the treatment of wastewater that combines the benefits of both granular biomass and membrane filtration.

Nearly clean effluents can be achieved with membrane filtration using, say, micro- or ultra-filtration membranes. The fouling problems associated with prior art waste treatment processes are overcome or at least ameliorated by the disclosed water treatment process. Such membrane fouling is minimized in the GMBR, which can perform membrane filtration of mixed liquor in the presence of a stable granular biomass.

Additionally, the aggregation of microorganisms into compact granular biomass confers benefits such as protection against predation, resistance to chemical toxicity and better availability of carbon and energy sources for effective biological treatment. Moreover, dense bacterial populations are known to be hot-spots for horizontal gene transfer (HGT), which is a strategy used by microbial communities to spread existing catabolic pathways and adapt to the presence of xenobiotics in their environment. In this regard, tight packing of microorganisms within the granules can facilitate horizontal gene transfer, which in turn can enhance the ability of granules to degrade recalcitrant or toxic compounds as the genes that encode these biodegradation pathways can be more easily distributed to other microorganisms.

Advantageously, it has been found by the inventors that operating the submerged membrane with at least 40% of the bioactive material in granular form, preferably at least 90% or more in granular form, significantly reduces pore blocking and the adsorption of colloids or solutes on the membrane. Advantageously, the reactor is capable of operating at a higher flux permeate over time relative to submerged membranes with minimal or no bioactive material in granular form.

Advantageously, it has been found by the inventors that it is not necessary to utilise any carriers in the disclosed water treatment process.

Advantageously, it has been found by the inventors that the size of the granular particles prevents or at least inhibits fouling on the membrane. Hence, fouling problems associated with prior art are ameliorated or avoided.

While the invention has been illustrated with reference to a specific media, any liquid media can be treated to reduce the physically, chemically and biologically removable material therein.

While the invention has been illustrated with reference to a specific reactor configuration and a specific set of operating protocols, variations in reactor configuration and operating protocols can be introduced to establish granular sludge with simultaneous membrane filtration for the treatment of wastewater to achieve nearly clear effluent with minimal membrane fouling.

While the disclosed embodiment has been demonstrated to retain approximately 6,000 mg L−1 of biomass in the reactor, biomass concentration is a function of the wastewater load applied, and higher biomass concentrations in excess of 10,000 mg L−1 can be retained in the GMBR with higher wastewater loads.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

REFERENCES

1. APHA. 1998. Standard methods for the examination of water and wastewater, 20th edition. American Public Health Association, Washington, D.C.
2. Xiufen Li, Fangshu Gao, Zhaozhe Hua, Guocheng Du, Jian Chen, '*Treatment of synthetic wastewater by a novel MBR with granular sludge developed for controlling membrane fouling*', Separation & Purification Technology (2005)

The invention claimed is:

1. A waste water treatment process comprising the steps of:
    (a) providing bioactive material in waste water, the bioactive material containing microorganisms capable of removing one or more impurities from the waste water, wherein at least 40% by volume of said bioactive material in said waste water is maintained in granular form; and
    (b) passing a portion of the waste water through a membrane separator, whereby the membrane separator prevents the bioactive material from passing therethrough.

2. A waste water treatment process as claimed in claim 1, wherein substantially all of said bioactive material in said waste water is maintained in granular form.

3. A waste water treatment process as claimed in claim 1, comprising the step of:
    (c) introducing the waste water into a reactor having a chamber containing the bioactive material.

4. A waste water treatment process as claimed in claim 1, wherein water passed through the membrane separator produces permeate water having a lower concentration of impurities relative to reject water that has not passed through the membrane separator.

5. A waste water treatment process as claimed in claim 3, wherein the method comprises the step of:
    (d) seeding bioactive material in waste water within the chamber.

6. A waste water treatment process as claimed in claim 5, comprising the step of:
    (e) growing the microorganisms contained within the bioactive seed material to form larger particles of granular size.

7. A waste water treatment process as claimed in claim 6, comprising the step of:
    (f) agitating the suspended material to at least partially inhibit deposition of particles on the membrane separator.

8. A waste water treatment process as claimed in claim 7, comprising the step of:
    (g) removing bioactive material particles of a discharge size from the chamber whilst retaining bioactive material particles of a granular size within the chamber.

9. A waste water treatment process as claimed in claim 8, comprising the step of:
    (h) allowing bioactive particles of granular size to settle in a region adjacent the bottom of the chamber.

10. A waste water treatment process as claimed in claim 9, comprising after step (h), the step of:
    (i) discharging water containing a suspension of said discharge size particles from the chamber.

11. A waste water treatment process as claimed in claim 3, wherein the reactor is operated in a batch mode.

12. A waste water treatment process as claimed in claim 1, comprising the step of:
    (j) supplying oxygen-containing gas to the waste water.

13. A waste water treatment process as claimed in claim 1, comprising the step of:
    (k) agitating the waste water to at least partially inhibit deposition of particles on the membrane separator.

14. A waste water treatment process as claimed in claim 13, wherein said agitating comprises aerating the waste water.

15. A waste water treatment process as claimed in claim 13, wherein said agitating comprises mechanically agitating the waste water.

16. A waste water treatment process as claimed in claim 1, wherein the bioactive material in granular form have a particle size in the range selected from the group consisting of about 50 μm to about 10 mm, about 50 μm to about 8 mm, about 50 μm to about 6 mm, about 50 μm to about 4 mm, about 50 μm to about 2 mm, about 50 μm to about 10 mm, about 100 μm to about 10 mm, 500 μm to about 10 mm, about 1000 μm to about 10 mm, about 100 μm to about 2 mm, about 200 μm to about 2 mm, about 400 μm to about 1.5 mm, and about 600 μm to about 1.5 mm.

17. A waste water treatment process as claimed in claim 3, comprising the step of:
    (l) allowing the bioactive material in granular form to settle under gravity in the chamber of the reactor.

18. A waste water treatment process as claimed in claim 17, comprising the step of:
    (m) removing water above the settled bioactive materials in granular form from the chamber.

19. A waste water treatment process as claimed in claim 3, wherein the reactor is operated in a continuous mode.

20. A waste water treatment process as claimed in claim 3, wherein the passing step comprises the step of:
    (n) selecting a target volumetric exchange ratio by passing a selected volume of waste water through the membrane separator, wherein said target volumetric exchange ratio is said volume of waste water passed through the membrane separator relative to the total initial volume of waste water in the chamber of the reactor.

21. A waste water treatment process as claimed in claim 20, wherein the target volumetric exchange ratio is selected from the group consisting of about 20% vol to about 90% vol, about 30% vol to about 80% vol, about 40% vol to about 70% vol, and about 45% vol to about 60% vol.

22. A waste water treatment process as claimed in claim 1, wherein the volumetric concentration of the bioactive materials that are in granular form is in the range selected from the group consisting of: at least 50% by volume; at least 60% by volume; at least 70% by volume; at least 80% by volume; at least 90% by volume; at least 95% by volume; and at least 99% by volume.

23. A method of forming bioactive granules for use in a water treatment reactor comprising a chamber that is in fluid communication with a membrane separators the method of forming bioactive granules comprising the steps of:
  (a) suspending bioactive seed material in waste water within the chamber, the bioactive seed material containing microorganisms capable of removing one or more impurities from the waste water;
  (b) growing the microorganisms contained within the bioactive seed material to form larger particles; and
  (c) removing particles of a selected discharge particle size from the chamber whilst retaining bioactive particles of a selected granular size within the chamber.

24. A method of forming bioactive granules as claimed in claim 23, further comprising the step of:
  (d) agitating the suspended material to at least partially inhibit deposition of particles on the membrane separator.

25. A method of forming bioactive granules as claimed in claim 23, further comprising the step of:
  (e) introducing further waste water into the chamber before repeating step (c).

26. A method of forming bioactive granules as claimed in claim 25, further comprising the step of:
  (f) providing additional bioactive seed material in step (e).

27. A method of forming bioactive granules as claimed in claim 25, wherein in step (e) is repeated to obtain bioactive particles of the selected granular size within the chamber.

28. A method of forming bioactive granules as claimed in claim 26, wherein step (f) is repeated to obtain bioactive particles of the selected granular size within the chamber.

29. A method of forming bioactive granules as claimed in claim 23, comprising the step of:
  (g) allowing bioactive granular size particles to settle in the chamber.

30. A method of forming bioactive granules as claimed in claim 29, comprising after step (g), the step of:
  (h) discharging water containing a suspension of said discharge size particles from the chamber.

31. A method of forming bioactive granules as claimed in claim 23, comprising the step of:
  (i) supplying oxygen-containing gas to the waste water.

32. A waste water treatment system comprising:
  a reactor having a chamber for containing waste water therein;
  bioactive material for suspension in said waste water, the bioactive material containing microorganisms capable of removing one or more impurities from the waste water, wherein in use, at least 40% by volume of said bioactive material in said waste water is maintained in granular form; and
  a membrane separator in fluid communication with the chamber, wherein a portion of the waste water is passed through the membrane separator to produce permeate water having a lower concentration of impurities relative to reject water that has not passed through the membrane separator.

33. A water treatment system as claimed in claim 32, wherein the membrane separator is located within the chamber.

34. A water treatment system as claimed in claim 32, wherein the membrane separator is located outside of the chamber.

35. A water treatment system as claimed in claim 32, wherein the bioactive material in granular form have a particle size in the range selected from the group consisting of about 50 μm to about 10 mm, about 50 μm to about 8 mm, about 50 μm to about 6 mm, about 50 μm to about 4 mm, about 50 μm to about 2 mm, about 50 μm to about 10 mm, about 100 μm to about 10 mm, 500 μm to about 10 mm, about 1000 μm to about 10 mm, about 100 μm to about 2 mm, about 200 μm to about 2 mm, about 400 μm to about 1.5 mm, and about 600 μm to about 1.5 mm.

36. A water treatment system as claimed in claim 32, wherein the volumetric concentration of the bioactive materials that are in granular form is in the range selected from the group consisting of: at least 50% by volume; at least 60% by volume; at least 70% by volume; at least 80% by volume; at least 90% by volume; at least 95% by volume; and at least 99% by volume.

37. A water treatment system as claimed in claim 32, wherein substantially all of said bioactive material in said waste water is maintained in granular form.

38. A water treatment reactor comprising:
  a chamber containing bioactive material suspended in waste water, the bioactive material containing microorganisms capable of removing one or more impurities from the waste water, wherein at least 40% by volume of said bioactive material in said waste water is in granular form; and
  a membrane separator in fluid communication with the chamber for allowing a portion of the waste water to be passed therethrough and thereby produce permeate water having a lower concentration of impurities relative to reject water that has not passed through the membrane separator.

39. Water produced in a process comprising the steps of:
  (a) providing bioactive material in waste water, the bioactive material containing microorganisms capable of removing one or more impurities from the waste water, wherein at least 40% by volume of said bioactive material in said waste water is maintained in granular form; and
  (b) passing a portion of the waste water through a membrane separator, whereby the membrane separator prevents the bioactive material from passing therethrough.

40. Bioactive granules produced in a method as claimed in claim 23.

41. A waste water treatment process comprising the steps of:
  (a) providing bioactive material in the waste water, said bioactive material containing microorganisms capable of removing one or more impurities from the waste water, and wherein at least a portion of said bioactive material is in granular form;
  (b) removing at least a portion of said bioactive material not in granular form from said waste water; and
  (c) passing a portion of the waste water through a membrane separator, whereby the membrane separator prevents the bioactive material from passing therethrough.

42. A waste water treatment process as claimed in claim 41, wherein said removing step comprises removing substantially all of said bioactive material not in granular form from said waste water.

* * * * *